United States Patent

Kawai

[11] Patent Number: 5,898,535
[45] Date of Patent: Apr. 27, 1999

[54] METHOD AND APPARATUS FOR RECORDING AND REPRODUCING DATA IN AND FROM A DATA SECTOR EVEN WHEN THERMAL ASPERITY OCCURS IN THE SERVO AREA

[75] Inventor: Yasumasa Kawai, Tokyo, Japan

[73] Assignee: Kabushiki Kaisha Toshiba, Kawasaki, Japan

[21] Appl. No.: 08/720,182

[22] Filed: Sep. 25, 1996

[30] Foreign Application Priority Data

Jun. 24, 1996 [JP] Japan ................................ 8-163041

[51] Int. Cl.⁶ ...................................... G11B 5/596
[52] U.S. Cl. ..................... 360/77.02; 360/75; 360/77.02; 371/40.14
[58] Field of Search ................. 360/75, 46, 78, 360/53, 25, 31; 371/40.3

[56] References Cited

U.S. PATENT DOCUMENTS

| | | | |
|---|---|---|---|
| 4,669,004 | 5/1987 | Moon et al. | 360/77 |
| 4,783,705 | 11/1988 | Moon et al. | 360/77 |
| 4,914,398 | 4/1990 | Jove et al. | 328/167 |
| 5,233,482 | 8/1993 | Gailbraith et al. | 360/46 |
| 5,527,110 | 6/1996 | Abraham et al. | 360/75 |
| 5,537,034 | 7/1996 | Lewis | 360/72.1 |
| 5,583,842 | 12/1996 | Wilson et al. | 369/54 |
| 5,666,237 | 9/1997 | Lewis | 360/75 |
| 5,696,643 | 12/1997 | Tsuwako et al. | 360/73.03 |
| 5,701,314 | 12/1997 | Armstrong et al. | 371/40.3 |
| 5,708,537 | 1/1998 | Gailbraith et al. | 360/46 |
| 5,754,355 | 5/1998 | Nakamura et al. | 360/73.03 |

*Primary Examiner*—Aristotelis M. Psitos
*Assistant Examiner*—Joseph M Vann
*Attorney, Agent, or Firm*—Limbach & Limbach LLP

[57] ABSTRACT

A read/write circuit detects the occurrence of a thermal asperity in accordance with data read from a disk. Thermal asperity status register sets a flag corresponding to thermal asperity occurrence spot in a servo area. A write/read fault generator outputs no WRF signals if the corresponding flag of the thermal asperity status register is set even when error detection is notified from an address error register, and thereby enables a sequencer to continue its recording and reproducing operation.

12 Claims, 7 Drawing Sheets

| SELECT (S) | OUTPUT (O) |
|---|---|
| 0 | A |
| 1 | B |

F I G. 7

F I G. 11

| SERVO SECTOR | FIRST | SECOND | | n-th |
|---|---|---|---|---|
| VCM CONTROLLING CURRENT VALUE | $I_1$ | $I_2$ | | $I_n$ |
| MEAN VALUE | $\bar{x}_1 = \dfrac{I_1 + I_0}{2}$ | $\bar{x}_2 = \dfrac{I_2 + \bar{x}_1}{2}$ | | $\bar{x}_n = \dfrac{\bar{x}_{n-1} + I_n}{2}$ |

METHOD AND APPARATUS FOR RECORDING AND REPRODUCING DATA IN AND FROM A DATA SECTOR EVEN WHEN THERMAL ASPERITY OCCURS IN THE SERVO AREA

BACKGROUND OF THE INVENTION

1. Field of the Invention

The present invention relates to a magnetic disk drive and a servo processing method in the same. More particularly, the invention relates to a magnetic disk drive and a servo processing method, in which an appropriate control operation is performed even when a thermal asperity occurs in an MR head.

2. Description of the Related Art

Generally, there has been utilized a hard disk drive (HDD), or, a magnetic disk drive, as a storage device for a desk-top type personal computer or a notebook type portable computer. This magnetic disk drive records and reproduces data in and from a storage medium (disk) by using a magnetic head. The storage medium is manufactured by coating and depositing a magnetic recording film on a disk-like aluminum substrate (alumina processed).

In recent years, in such a magnetic disk drive, an MR (Magnetoresistive) head is used to record data at a high density on small-diameter disk. The MR head makes use of MR effect provided by a thin permalloy film made of iron and nickel, whose electric resistance changes when an ambient magnetic field changes in intensity.

In the MR head, however, a typical phenomenon called a thermal asperity (TA) may occur. That is, the electric resistance may change due to heat produced by friction when the MR head comes into contact with irregular portions on the disk or dusts. The thermal asperity results in various inconvenience produced in the conventional magnetic disk drive.

If thermal asperity occurs in a servo area storing information necessary for positioning the MR head in a predetermined location on the disk, accurate information indicating the position of the MR head would not be obtained, making it impossible to perform data reproducing. This is particularly true in the case of the conventional magnetic disk drive in which recording and reproducing of data are prohibited when an error occurs in its servo area. In such a magnetic disk drive, data may not be recorded or reproduced in or from a sector in which an error due to a thermal asperity has been detected.

SUMMARY OF THE INVENTION

It is an object of the invention to provide a magnetic disk drive and a servo processing method in the same capable of recording and reproducing data in and from a data sector of a servo area if thermal asperity occurs in the servo area.

According to a first aspect of the invention, there is provided a magnetic disk drive which comprises: an MR (Magnetoresistive) head; a magnetic disk as a storage medium, which has a plurality of concentric tracks provided in a radial direction and each having a plurality of servo sectors each constituted by a data area and a servo area; reading means for reading data stored in the magnetic disk by using the MR head; detecting means for detecting an occurrence of thermal asperity from the data read by the reading means; and determining means for determining in which of the data areas and servo areas the thermal asperity has occurred, when the detecting means detects the occurrence of the thermal asperity.

In the magnetic disk drive according to the first aspect of the invention, it is determined whether thermal asperity has occurred in the servo area or in the data area. If thermal asperity occurs in the servo area after the magnetic disk drive has been shipped, processing will be performed, which is different from the processing performed when an address error occurs. This makes it possible to perform reading and writing of data from and in the data sector resent in the servo sector in which the thermal asperity has occurred. In addition, by performing an alternative operation (reassigning processing) for transferring data to another normal data sector, the occurrence of the thermal asperity may be prevented when reading and writing of the same data is to be performed again.

According to a second aspect of the invention, there is provided a magnetic disk drive which comprises: an MR (Magnetoresistive) head; a magnetic disk as a storage medium, which has a plurality of concentric tracks provided in a radial direction and each having a plurality of servo sectors each constituted by a data area and a servo area including a burst portion recorded in which data to be used for indicating a positioning error of the MR head is recorded; positioning means for positioning the MR head in a position on the magnetic disk in accordance with a control current; reading means for reading data stored in the magnetic disk by using the MR head; detecting means for detecting an occurrence of a thermal asperity from the data read by the reading means; determining means for determining whether or not the thermal asperity has occurred in the servo area when the detecting means detects the occurrence of the thermal asperity; first supplying means for supplying the control current in accordance with data recorded in the servo area, to the positioning means so that the MR head is positioned in a desired position; and second supplying means for supplying an optimal current to the positioning means instead of the control current supplied by the first supplying means, when the determining means determines the thermal asperity has occurred in the servo section.

In the magnetic disk drive according to the second aspect of the invention, it is determined whether thermal aspect has occurred in the burst area of the servo area or not. If the thermal aspect occurs in the servo area after the magnetic disk drive has been shipped, processing will be performed, which is different from the processing performed when an address error occurs. This makes it possible to perform reading and writing of data from and in the data sector existent in the servo sector in which the thermal asperity has occurred. Furthermore, by performing an alternative operation for transferring data to another normal data sector, the occurrence of the thermal asperity may be prevented when reading and writing of the same data is to be performed again.

Moreover, if the thermal asperity occurs in a servo signal area, that is, when information different from positional information to be originally obtained is provided, by supplying an average value of VCM control currents in the servo sector or a value obtained by correcting a DC offset current value as a VCM control current value into a VCM driver, MR head positioning control may be prevented from being unstable, making it possible to keep appropriate positioning control.

According to a third aspect of the invention, there is provided a servo control method in a magnetic disk drive having a MR head and a magnetic disk which has a plurality of concentric tracks provided in a radial direction and having servo sectors each constituted by a data area and a servo area. The servo control method comprises the steps of:

reading data stored in the magnetic disk by using the MR head; detecting an occurrence of a thermal asperity from the data read in the reading step; and determining in which of the data areas and servo areas the thermal asperity has occurred when the determining step determine the occurrence of the thermal asperity.

In the servo processing method according to the third aspect of the invention, it is determined in which area thermal asperity has occurred, in the servo area or in the data area. If the thermal asperity occurs after the magnetic disk drive has been shipped, processing different from the processing performed when an address error occurs. This makes it possible to perform reading and writing of data from and in the data sector existent in the servo sector in which the thermal asperity has occurred. In addition, by performing an alternative operation for transferring data to another normal data sector, the occurrence of the thermal asperity may be prevented when reading and writing of the same data is to be performed again.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENTS

The preferred embodiment of the invention will now be described with reference to the accompanying drawings.

Figure 1:
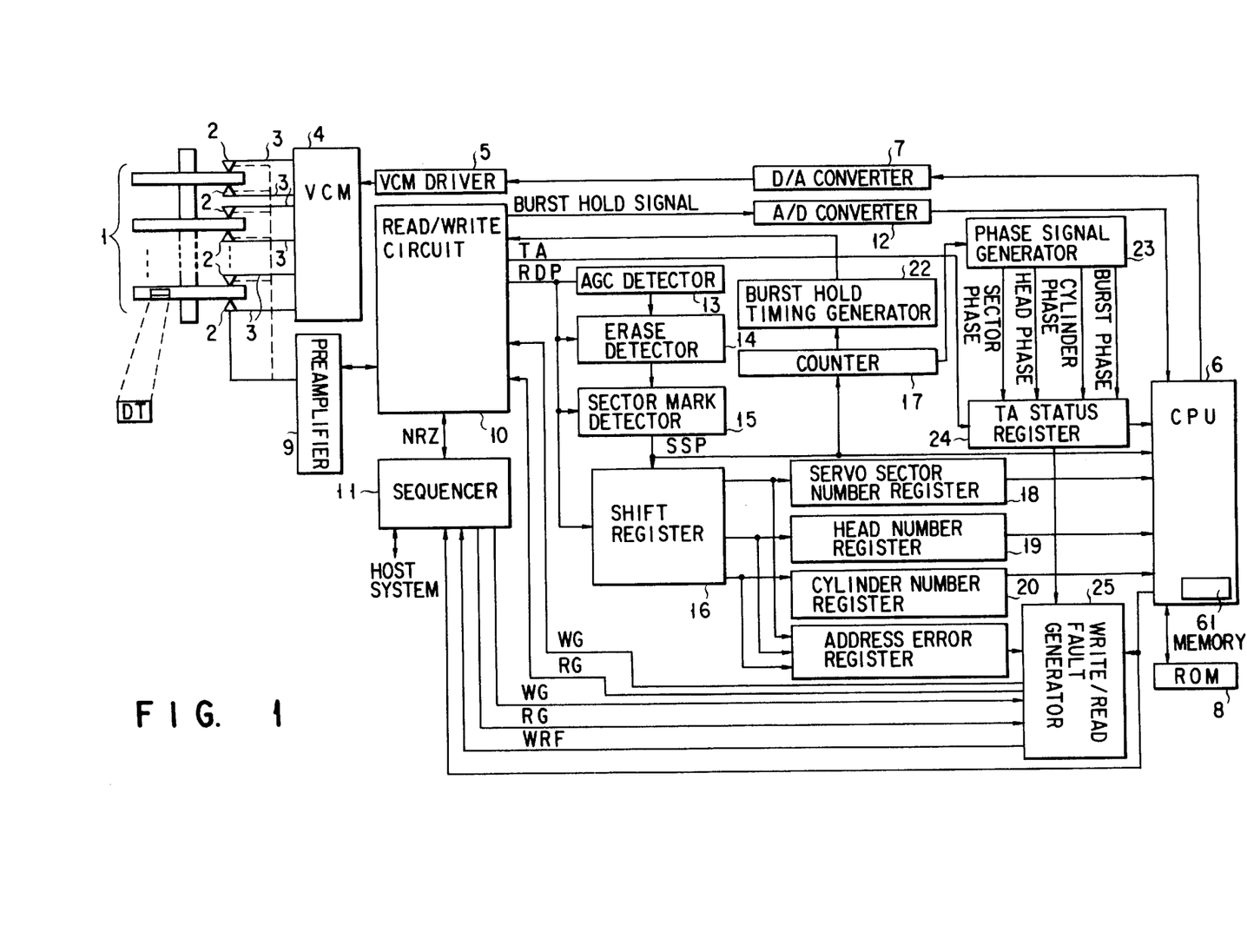
FIG. 1 is a block diagram showing a structure of a magnetic disk drive of an embodiment of the invention regarding servo processing.

FIG. 1 illustrates the magnetic disk drive of the invention relating to servo processing.

Figure 2:
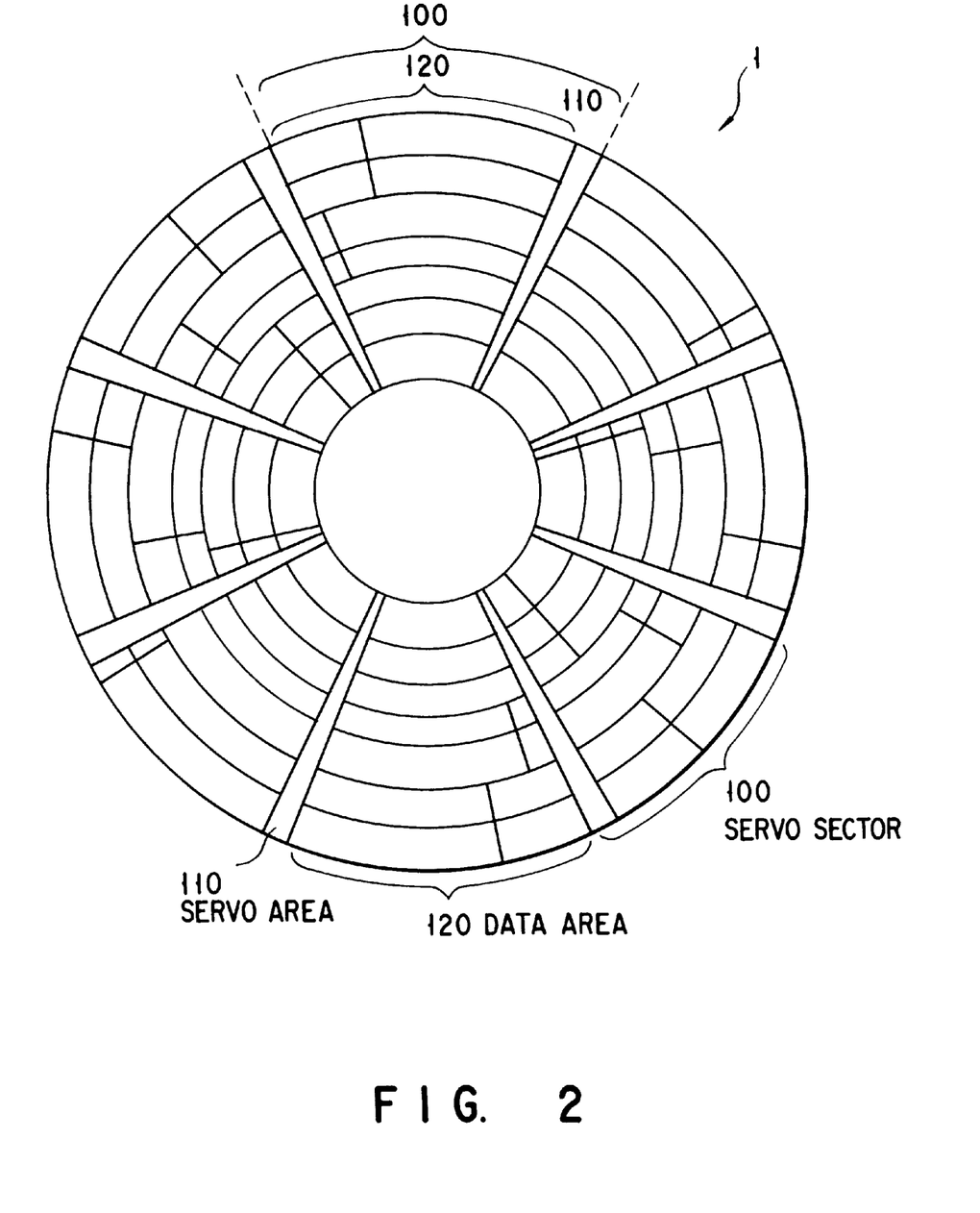
FIG. 2 is a view showing a structure of a disk area in the magnetic disk drive shown in FIG. 1.

The magnetic disk drive shown in FIG. 1 is provided with a plurality of built-in disks 1 as storage devices. A defect table (DT) indicating the position of a sector incapable of data recording/reproducing is provided in a predetermined location in the disk 1. Assume that an embedded servo system is utilized for the disk 1. Thus, as shown in FIG. 2, the disk 1 has a number of concentric tracks spaced apart a radial direction. Each track is divided into a plurality of sectors (servo sector) 100. Each servo sector 100 is composed of a servo area 110 for recording servo data used for positioning control and a data area 120 (constituting a plurality of data sectors) for recording data. In the disk 1, servo areas 110 are disposed with equal spaces radially over tracks.

Figure 3:
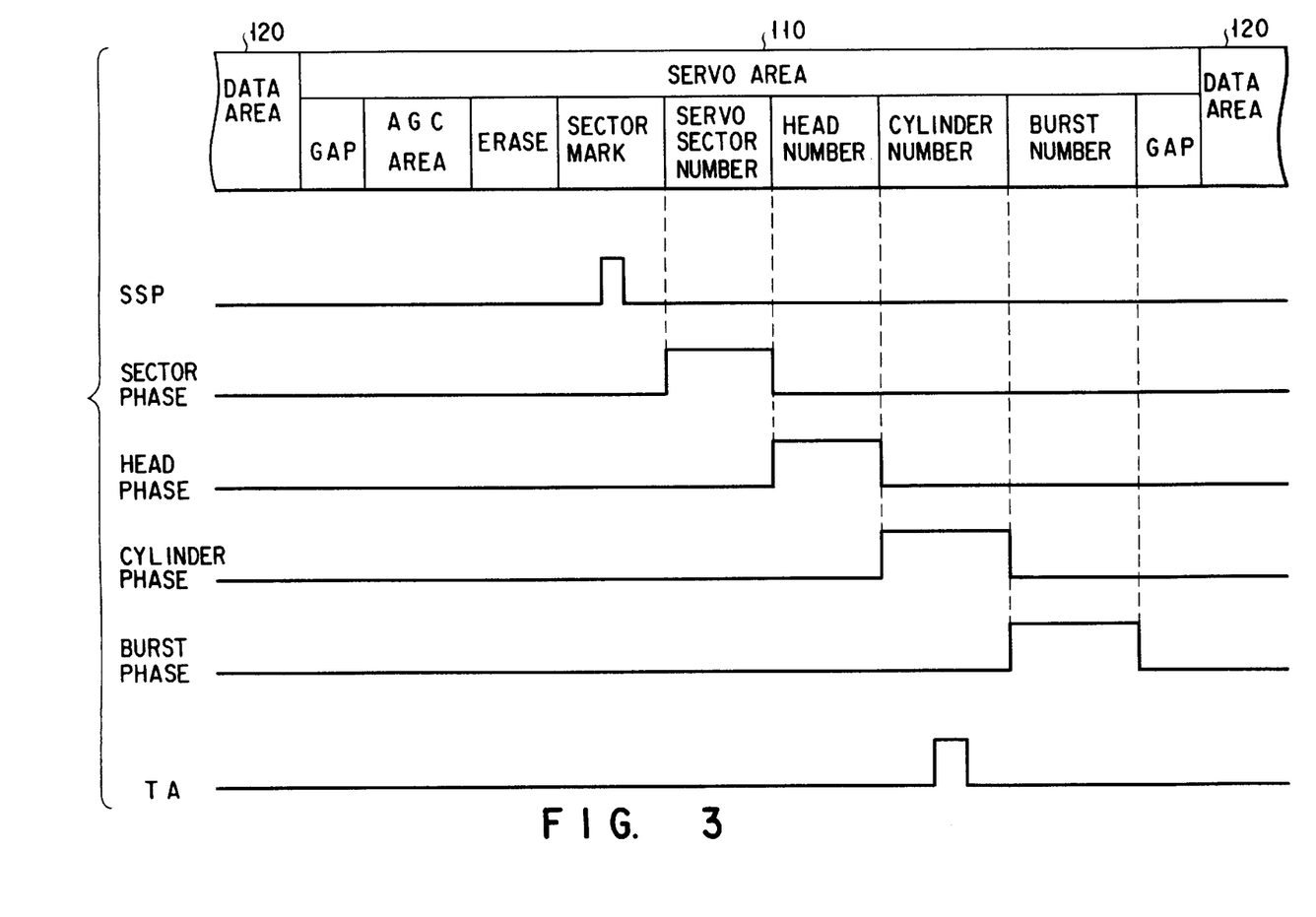
FIG. 3 is a view showing the structure of a servo area in the magnetic disk drive shown in FIG. 1, timings for generating servo sector pulses (SSP) and phases, and an example of a signal TA indicating an occurrence of a thermal asperity.

The servo area 110 is provided with an area configuration for recording data as shown in FIG. 3., with the start and end of the servo area recorded with GAP's. After GAP indicating the start of the servo area, there are provided in sequence an AGC (Automatic Gain Control) area in which data of a certain frequency for stabilizing the amplitude of a signal is recorded, an erase area in which data indicating ERASE is recorded, a servo sector number area in which data indicating a servo sector number is recorded, a head number area in which data indicating a head number is recorded, a cylinder number area in which data indicating a cylinder number is recorded, and a burst signal area in which data indicating a positioning error in the cylinder with wave form amplitude is recorded.

Referring again to FIG. 1, MR heads 2 used for recording and reproducing of data are provided in each surface of the plurality of disks 1 having the above-noted structures. The disk 1 is rotated at a high speed by a spindle motor(not shown). The MR head 2 is attached to a head moving mechanism called a carriage 3, and moved in the radial direction of the disk 1 by means of the movement of this carriage 3. The carriage 3 is driven by a voice coil motor (VCM) 4.

The voice coil motor 4 is connected to a VCM driver 5. It controls the movement of the carriage 3 when suppled with a control current. A control current value (controlled variable) output from the VCM driver 5 is given as an analog value by a D/A (Digital/Analog) converter 7 in accordance with processing of CPU (Central Processing Unit) 6.

CPU 6 controls the whole magnetic disk drive, by performing, for instance, alternative processing as will be later described, in accordance with programs stored in ROM (Read Only Memory). CPU 6 is provided with a memory 61 for storing an average value of control currents, also later described.

A preamplifier 9 is connected to the MR head 2, amplifies analog data read from the MR head 2, and supplies this amplified data to a read/write circuit 10. The read/write circuit 10 inputs the analog data amplified by the preamplifier 9 and performs signal processing necessary for a data reproducing operation, for instance conversion of an analog output into NRZ (Non-Return-Zero) data. The read/write circuit 10 also performs signal processing necessary for a data recording operation, for instance for modulating NRZ data (write data) sent from a sequencer 11 and converting thereof into data to be recorded in the disk 1.

The sequencer 11 interfaces with a host system (not shown) to which the magnetic disk drive is connected, and mainly performs transmission and reception of read/write data. The sequencer 11 is provided with a function for supplying signals WG and RG into a later described write/read fault generator 25 and notifying the occurrence of an error to the host system by stopping its operation in response to a write/read fault (WRF) sent from this write/read fault generator 25. The sequencer 11 also supplies a WG (Write Gate) signal caused to be active with a timing for writing data and a RG (Read Gate) signal caused to be active with a timing for reading data, into the write/read fault generator 25. These WG and RG signals are also supplied to the read/write circuit 10 by the write/read fault generator 25.

When the sequencer 11 writes data sent from the host into the magnetic disk 1, causes the WG signal to be active and sends NRZ data into the read/write circuit 10. When the sequencer 11 transfers data stored in the magnetic disk 1 into the host, causes the RG signal to be active, receives NRZ data from the read/write circuit 10 and sends this to the host.

The read/write circuit 10 reproduces data recorded in the servo area 110 in addition to the above-noted recording and reproducing of data. For instance, the circuit 10 extracts a data pulse by detecting a pulse peak from read data from the MR head 2, and performs processing of an analog signal containing a burst signal, by sample-holding this peak. That is, the circuit 10 holds the burst signal in accordance with an instruction from a later described burst hold timing generator 22, and supplies this burst hold signal to CPU 6 by an A/D converter 12.

Figure 4:
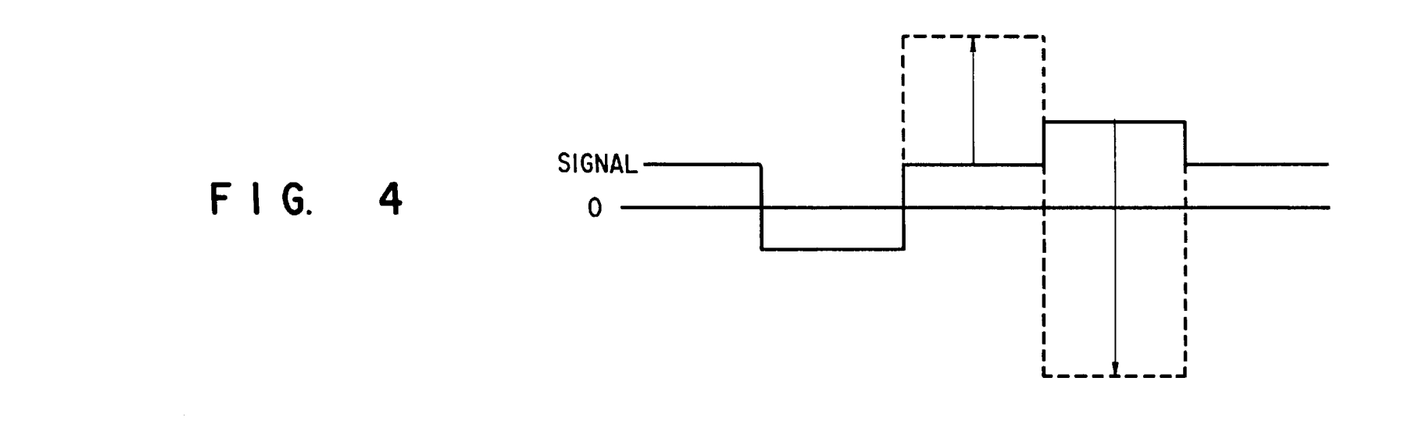
FIG. 4 is a view showing an example of a fluctuation in a read signal due to the occurrence of a thermal asperity.

The read/write circuit 10 has a function of detecting the occurrence of a thermal asperity (TA) from data sent from the preamplifier 9. The circuit 10 receives the data supplied from the preamplifier 9. Upon detecting such a signal not read from the disk 1, as indicated by a broken line in FIG. 4, among the data from the preamplifier 9, the read/write circuit 10 determines that thermal asperity has occurs. In this case, the circuit 10 supplies a signal TA to a thermal asperity (TA) status register 24 (later described).

The read/write circuit 10 binarizes data recorded in the servo area 110 and read by the MR head 2, and supplies this into an AGC detector 13, an erase detector 14, a sector mark detector 15 and a shift register 16 as shown in FIG. 1.

The AGC detector 13 detects data recorded in an AGC area from RPD supplied from the read/write circuit 10. Upon detecting the data recorded in the AGC area, the AGC detector 13 outputs an instruction to enable the erase detector 14. The erase detector 14 detects data recorded in an erase area from RPD supplied from the read/write circuit 10, in accordance with the instruction output from the AGC detector 13. After detecting the data recorded in the erase area, the erase detector 14 outputs an instruction to enable the sector mark detector 15. The sector mark detector 15 detects data recorded in a sector mark area from RPD supplied from the read/write circuit 10, in accordance with the instruction output from the erase detector 14. After detecting the data recorded in the sector mark area, the sector mark detector 15 supplies a servo sector pulse (SSP) into CPU 6, the shift register 16 and a counter 17.

Figure 5:
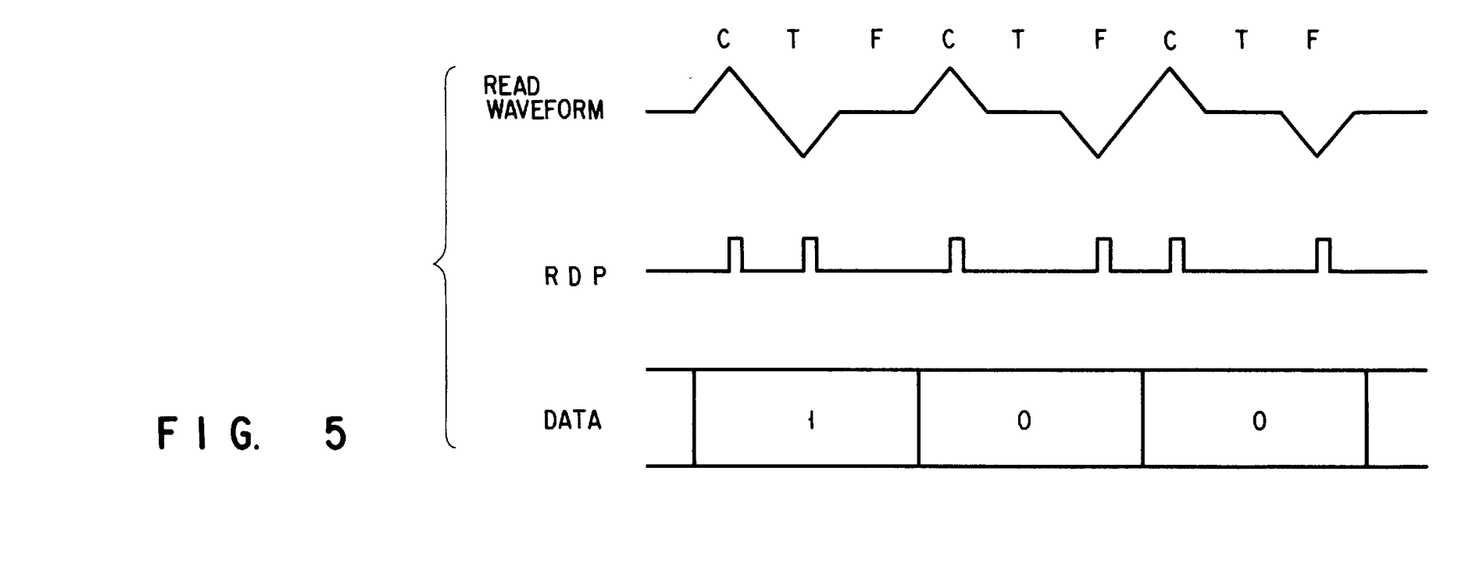
FIG. 5 is a view illustrating trial bits of the magnetic disk drive shown in FIG. 1.

The shift register 16 functions in response to SSP supplied, fetches servo sector number data, head number data and cylinder number data from RPD supplied from the read/write circuit 10, and connects these data together. These data are then set in a servo sector number register 18, a head number register 19 and a cylinder number register 20. The registers are connected to CPU 6. Servo information as servo sector number data, head number data and cylinder number data is, as shown in FIG. 5, configured by trial bits of CLOCK, TRUE and FALSE. The same information is written in TRUE and FALSE. Being provided with a servo sector number error flag, a head number error flag and a cylinder number error flag, an address error register 21 sets a corresponding flag when TRUE is not coincident with FALSE.

The counter 17 starts counting in response to SSP supplied from the sector mark detector 15, and supplies a counted value into a burst hold timing generator 22 and a phase signal generator 23. The burst hold timing generator 22 decodes the counted value sent from the counter 17, and notifies a burst signal hold timing to the read/writer circuit 10.

The phase signal generator 23 decodes the counted value sent from the counter 17, produces sector phase, head phase, cylinder phase and burst phase signals with a timing like that shown in FIG. 3 and supplies these signals to the thermal asperity (TA) status register 24.

The thermal asperity status register 24 is provided with a TA servo sector area generation flag, a TA head area generation flag, a TA cylinder area generations flag and a TA burst area generation flag. The register 24 takes a logical sum between each phase signal sent from the phase signal generator 23 and a signal TA sent from the read/write circuit 10 and sets a corresponding flag when a logical sum is 1. For instance, when a logical sum between a sector phase signal and a signal TA is 1, the TA servo sector area generation flag will be set. In this manner, if a thermal asperity occurs during reading of servo data, which servo area the thermal asperity has occurred in will be indicated by the flag.

The write/read fault generator 25 sends a write/read fault (WRF) for requesting the sequencer 11 to stop its operation to the same according to a control signal sent from CPU 6, signals WG and RG, each flag stored in the address error register 21 and each flag stored in the TA status register 24.

Figure 6:
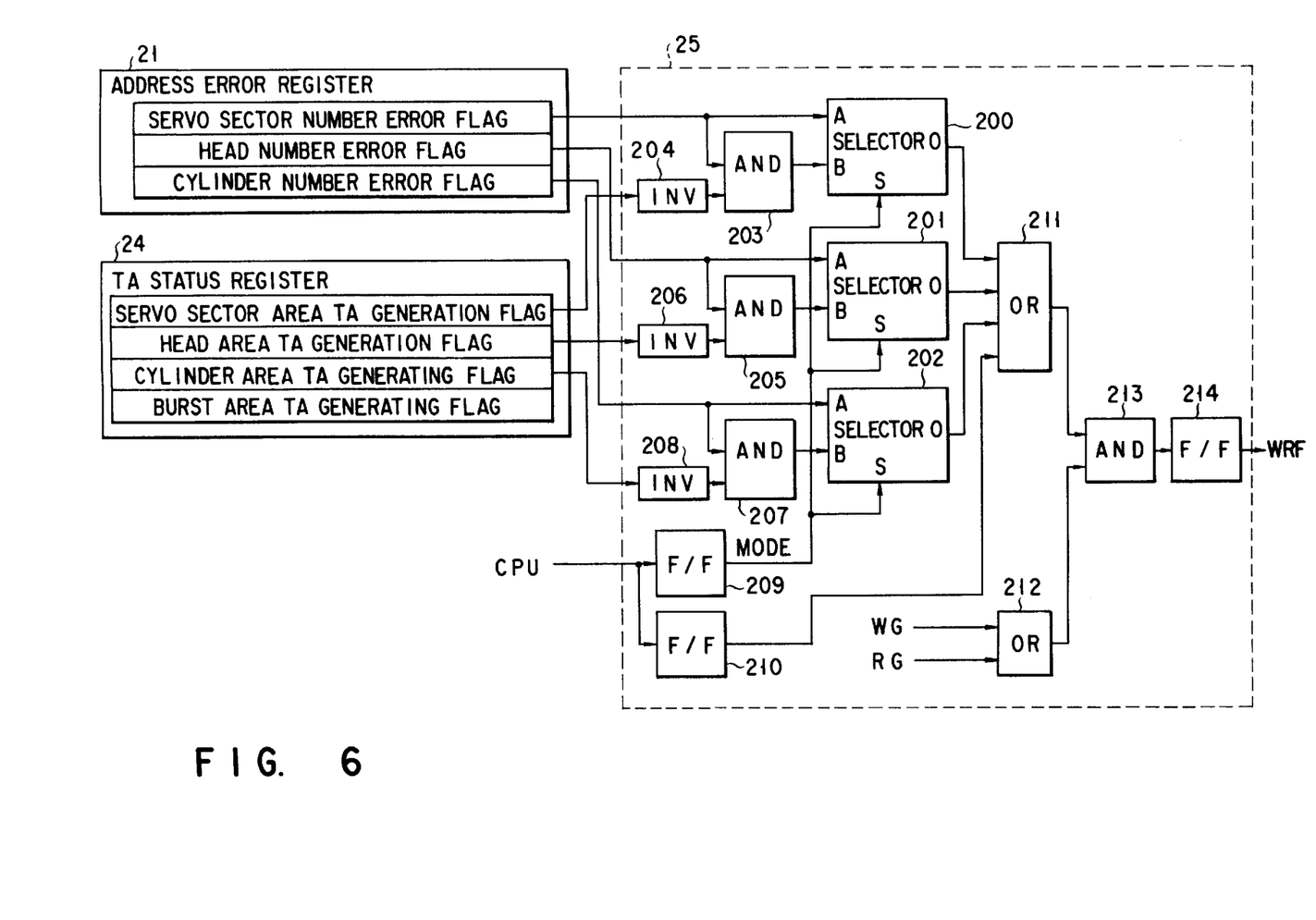
FIG. 6 is a view showing a structure and a connection of a write/read fault generator in the magnetic disk drive shown in FIG. 1.

Next, the structure and connection state of the write/read fault generator 25 will be described by referring to FIG. 6. The write/read fault generator 25 is provided with three selectors 200, 201 and 202. Each selector has two inputs A and B and outputs any of these inputs according to SELECT S.

The input A of the selector 200 represents the servo sector number error flag in the address error register 21. The input B of the selector 200 represents the output of an AND circuit (AND) 203. This AND circuit 203 outputs a logical product between the servo sector number error flag and the TA servo sector area generation flag of the TA status register 24 inverted by an inverter 204.

The input A of the selector 201 represents the head number error flag in the address error register 21. The input B of the selector 201 represents the output of an AND circuit (AND) 205. This AND circuit 205 outputs a logical product between the head number error flag and the TA head area generation flag of the TA status register 24 inverted by an inverter 206.

The input A of the selector 202 represents the cylinder number error flag in the address error register 21. The input B of the selector 202 represents the output of an AND circuit (AND) 207. This AND circuit 207 outputs a logical product between the head number error flag and the TA cylinder area generation flag of the TA status register 24 inverted by an inverter 208.

Figure 7:
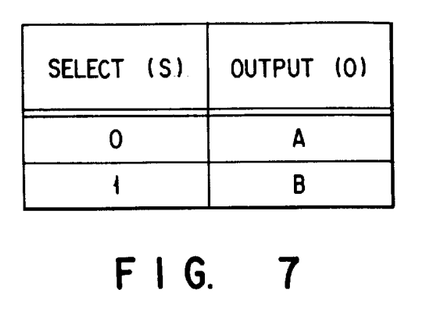
FIG. 7 is a view showing logical relationship of a selector applied to the write/read fault generator in the magnetic disk drive shown in FIG. 1.

Flip-flops (F/F) 209 and 210 hold control signals from CPU 6 and output these. MODE is set is the flip-flop 209 by CPU 6 and the flip-flop 209 supplies this MODE as SELECT (S) to the selectors 200, 201 and 202. A relationship between SELECT (S) and OUTPUT (O) in each selector is shown in the logical table of FIG. 7. MODE is set to "0" during manufacturing of the magnetic disk drive and "1" when it is shipped by CPU 6.

The output of the flip-flop 210 is supplied to an OR circuit 211. To the OR circuit, in addition to this output, the outputs of the selectors 200, 201 and 202 are supplied. A logical sum among all of these inputs is supplied to an AND circuit 213.

WG and RG signals from the sequencer 211 are sent to an OR circuit 212. The OR circuit 212 calculates a logical sum between these inputs and supplies its result to the AND circuit 213. The WG and RG signals from the sequencer 11 used for suspending write/read processing. For instance, when a fault condition stands true, the WG signal will be controlled to be inactive if this is active, thereby suspending write processing.

The AND circuit 213 calculates a logical product of logical sums sent from the OR circuits 211 and 212 and outputs this to a flip-flop 214. The flip-flop 214 outputs WRF to the sequencer 11 if the logical product of the AND circuit is "1".

Next, the operation of the embodiment will be described.

First, explanation will be made of an operation of reading servo data recorded in the servo area 110. The servo data is binarized by the read/write circuit 10 and output as RPD to the AGC detector 13, the erase detector 14, the sector mark detector 15 and the shift register 16. If the AGC area is detected by the AGC detector 13, the erase detector 14 is enabled, starting erase detection. If erase is detected, the sector mark detector 15 is enabled, starting the detection of a sector mark.

If the sector mark is detected, a servo sector pulse (SSP) is output from the sector mark detector 15 to CPU 6, the shift register 16 and the counter 17. The shift register 16 is enabled by SSP, a servo sector number, a head number and a cylinder number are fetched in the shift register and the results of these are respectively set in the servo sector number register 18, the head number register 19 and the cylinder number register 20. If it is determined that TRUE and FALSE are not coincident with each other in the read servo data, among the servo sector number error register flag, the head number error register flag and the cylinder number error register flag in the address error register 21, the flag corresponding to the area in which non-coincidence has occurred is set.

The operation of the counter 17 is started according to the input of SSP. A counted value by this counter 17 is decoded and a timing for holding a burst signal is notified from the burst hold timing generator 22 to the read/write circuit 10. In response to this notification, the read/write circuit 10 holds the amplitude of the burst signal, converts this into a digital signal by means of the A/D converter 12 outputs this to CPU 6. CPU 6 is thus enabled to know the position of the MR head.

In CPU 6, interruption is produced in response to SSP sent from the sector mark detector 15 and a program changes from interface processing to servo control processing. During servo control processing, CPU 6 obtains the accurate position of the MR head 2, from positional information stored in the servo sector number register 18, the head number register 19 and the cylinder number register 20 and the burst signal supplied through the A/D converter 12. If finding that the MR head 2 is shifted from its target position, CPU 6 outputs a VCM control voltage through the A/D converter 12 in a direction for correcting this. The VCM driver 5 controls VCM 4 by converting the control voltage into a current.

Explanation will next be made of an operation performed when such a thermal asperity occurs during reading of servo data.

The read/write circuit 10 detects the occurrence of a thermal asperity and supplies a TA signal to the thermal asperity status register 24. In the thermal asperity status register 24, a logical product of the TA signal and the sector phase, head phase, cylinder phase and burst phase signals is produced by the phase signal generator 23. A flag indicating the location of the thermal asperity in the servo area is then set in the thermal asperity status register 24. For example, when a thermal asperity occurs in the head number area, a logical product between the TA signal and the head phase signal will be "1", setting the TA head area generating flag. Information stored in the thermal asperity status register 24 may be read by CPU 6 and the TA servo sector area generation flag, the TA head area generation flag and the TA cylinder area generation flag are sent to the read/write fault generator 25.

Whatever the cause may be, the occurrence of a thermal asperity or otherwise, if an error is detected in any of the servo sector number area, the head number area or the cylinder number area of the servo area 110 (TRUE and FALSE are non-coincidence with each other), as described above, the corresponding flag (the servo sector number error flag, the head number error flag or the cylinder number error flag) in the address error register 21 will be set. Each of these flags is input to the write/read fault generator 25.

In the write/read fault generator 25, MODE is set to "0" by CPU 6 during manufacturing of the magnetic disk drive. "0" setting of MODE means that SELECT (S) supplied to the three selectors 200, 201 and 202 in the write/read fault generator 25 is "0". Accordingly, each selector selects the input A like that shown in the logical table of FIG. 7 and outputs this to the OR circuit 211. Information indicating the occurrence of a thermal asperity recorded in the thermal asperity status register 24 is thus ignored. Therefore, irrespective of the cause of an address error, a thermal asperity or otherwise, WRF is produced when any address error occurs and this is notified to the sequencer 11. Upon receiving WRF, the sequencer 11 interrupts data recording or reproducing and registers a data sector existent in this servo sector in the defect table (DT). The data sector registered in the defect table will not be used thereafter as an area incapable of data recording/reproducing.

MODE is set to "1" by CPU 6 when the magnetic disk drive is shipped. "1" setting of MODE means that SELECT (S) supplied to the selectors 200, 201 and 202 is "1". Each selector selects the input B like that shown in the logical table and outputs this to the OR circuit 211. The input B in each of the selectors 200, 201 and 202 is, as described above, a logical product between the flag stored in the address error register and a value obtained by inverting the flag stored in the thermal asperity status register 24 with the inverter 204, 206 or 208. When an address error occurs, if the flag indicating the occurrence of a thermal asperity is detected in the address area in which the error has occurred, the outputs of the AND circuits 203, 205 and 207 will be "0". Accordingly, the outputs of the selectors 200, 201 and 202 will be "0" and the outputs of the OR circuit 211 and the AND circuit 213 will also be "0", not producing WRF. This means that when an address error occurs in any of the servo sector number area, the head number area or the cylinder number area, if the cause of this is the occurrence of a thermal asperity, WRF will not be produced. The sequencer continues data recording/reproducing since no WRF is input.

It should be understood that the above-described operation of the write/read fault generator 25 is performed only in the case that a thermal asperity occurs in any of the servo sector number area, the head number area or the cylinder number area.

Next, explanation will be made of the case that a thermal asperity occurs in the burst signal area. When a thermal asperity occurs in the burst signal area, as in the above-described case that a thermal asperity occurs in the servo sector number area, the head number area or the cylinder number area, the corresponding flag in the thermal asperity status register 24 will be set. That is, the TA burst area generation flag in the thermal asperity status register 24 will be set. However, different from the previous case that the flag is set in any of the servo sector number area, the head number area or the cylinder number area, the set flag is notified to CPU 6 without being sent to the write/read fault generator 25.

According to the notification from the thermal asperity status register 24, CPU 6 does not execute VCM control by using the head positional information obtained from the burst signal. Instead, CPU 6 outputs an average value among the control currents of the servo sector stored in a memory 61 as a VCM control current to the D/A converter 7.

Figure 8:
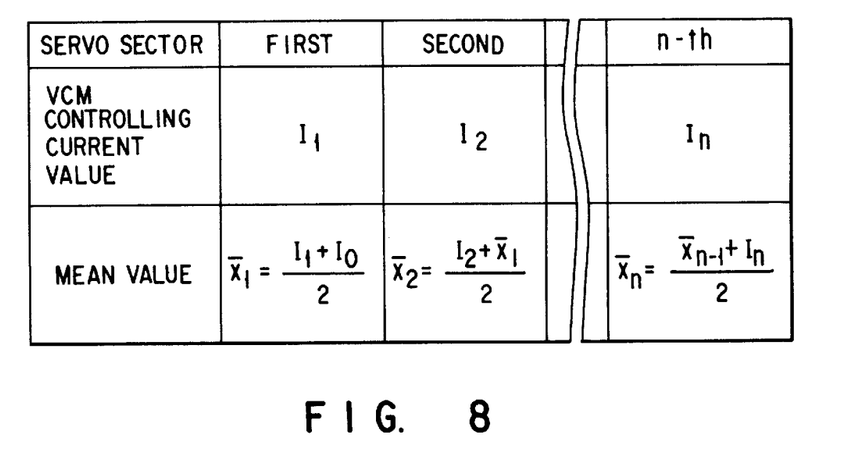
FIG. 8 is a view showing an example of a calculated average value recorded in a memory provided in CPU in the magnetic disk drive shown in FIG. 1.

In other words, CPU 6 outputs a VCM control current based on a servo signal read during servo control and records an average value among the control currents of the servo sector in the memory 61 each time. The average value among the control currents of the servo sector is calculated each time as shown in FIG. 8 and recorded in the memory 61. Such a calculation is started from a first servo sector after off-tracking of the MR head 2. I0 represents the default value of a preset VCM control current. In this manner, even when receiving an extremely improper burst signal due to the occurrence of a thermal asperity, CPU 6 may output a proper VCM control current to the D/A converter 7 and continue to perform its positioning operation.

If the TA servo area generation flag indicating the occurrence of a thermal asperity in the burst area during manufacturing of the magnetic disk is detected, as in the case of the occurrence of a thermal asperity in the servo sector number area, the head number area or the cylinder number area, an address indicating a data sector existent in this servo sector will be registered in the defect table (DT) of a disk 1.

Such processing enables data to be read even if a thermal asperity occurs in the servo area after the magnetic disk has been shipped. Moreover, even if this thermal asperity occurs in the servo signal area, that is, if information different from positional information to be originally obtained is provided, it is possible to continue proper positioning control of the MR head 2 without supplying any extremely improper VCM control current values.

Figure 9:
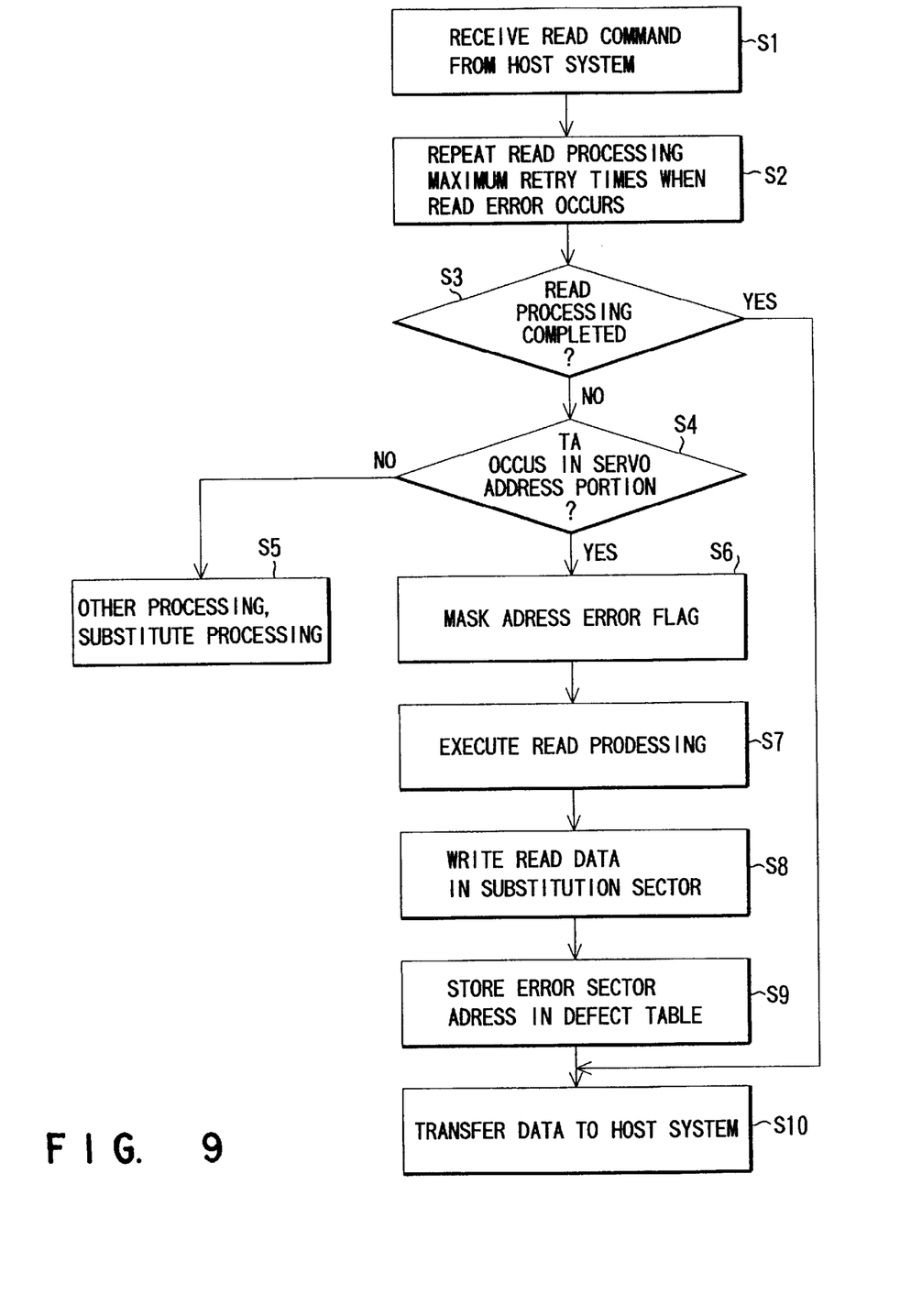
FIG. 9 is a flow chart illustrating alternative processing during reading of data in the magnetic disk drive shown in FIG. 1.

Next, a processing operation including alternative processing during reading of data in the magnetic disk drive will be described by referring to the flow chart shown in FIG. 9.

First, the sequencer 11 receives a read command from the host and notifies this to CPU 6 (step S1). Then, CPU 6 positions the MR head 2 in an appropriate track according to an address received from the host device. The sequencer 11 controls the read/write circuit 10 and reads data from a specified data area. When an error occurs during this reading operation, the sequencer 11 repeats its reading processing by the predetermined number of times (step S2).

After the data has been correctly read during its reading processing repeated within the specified number of times (step S3, YES), the sequencer 11 transfers this to the host device (step S10).

After the data has been incorrectly read during the reading processing repeated within the specified number of times (step S4, NO), a WRF signal is supplied from the write/read fault generator to the sequencer 11, the reading processing is interrupted and an alternative operation is performed based on the usual occurrence of an error. If the error has occurred due to the generation of a thermal asperity in the servo area (step S4, YES), an address error flag is masked without any WRF signals produced and the read/write circuit 10 executes reading of data (step S6 and S7). CPU 6 and the sequencer 11 record the read data in a preset alternative sector (step S8).

Then, the address of the sector in which the thermal asperity has occurred is registered in the defect table (DT) in the disk 1 and thereafter this will not be used for read/write processing (step S9). the sequencer 11 transfers the read data to the host (step S10).

Such processing enables data to be read from a given sector even if a thermal asperity occurs in the servo area. It is further possible to write this read data in another alternative sector.

During writing of the data, irrespective of the cause of an error, a thermal asperity or otherwise, an alternative operation for reassigning a sector may be performed.

In the embodiment described thus far, when a thermal asperity occurs in the burst signal area, CPU 6 outputs an average control value among the VCM control currents of the previous servo sector. Instead of this average value, however, a DC offset current value may be output as a VCM control current value. Next, explanation will be made of a modified example in which this DC offset current value is supplied as a VCM control current.

Figure 10:
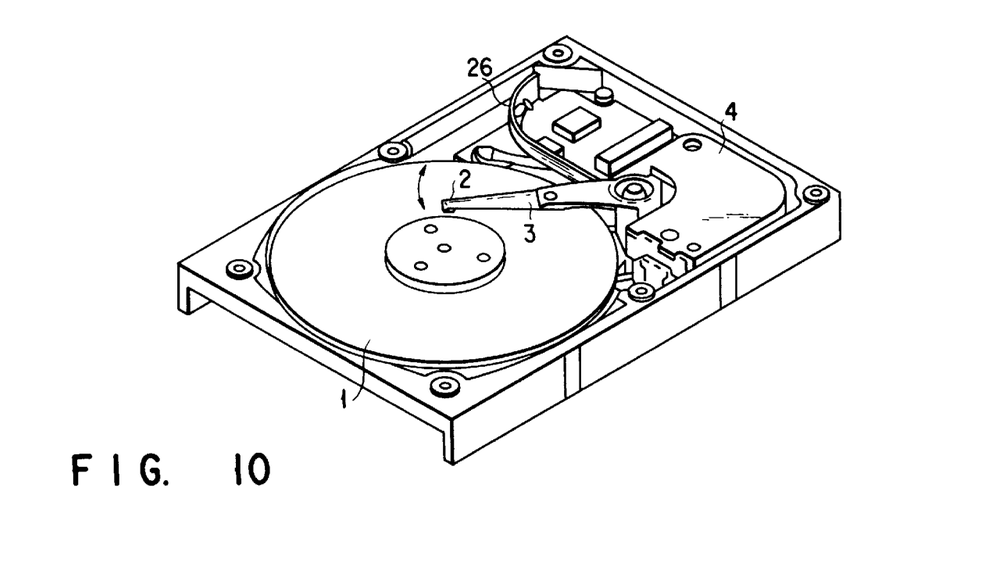
FIG. 10 is a perspective view showing an internal structure of the magnetic disk drive shown in FIG. 1.

FIG. 10 is a perspective view showing the internal structure of the magnetic disk drive in perspective. FPC (Flexible Printed Circuit) 26 shown in the drawing represents a circuit for interconnecting the preamplifier 9 and the read/write circuit 10 of FIG. 1. Since FPC 26 is bent when the MR head 2 is positioned in a track, a force for making this FPC straight is always applied to the carriage 3. In order to prevent the MR head 2 from shifting away from its determined position even when such a force is applied to the carriage 3, it is necessary to supply a VCM control current in a direction opposite that of the force applied by FPC 26. This current is called a DC offset current.

Figure 11:
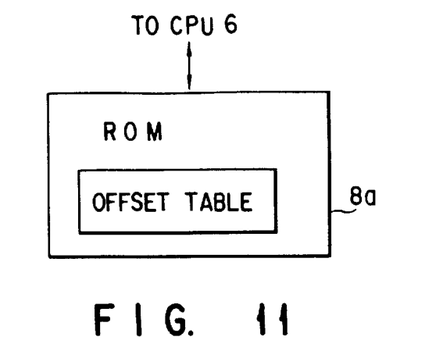
FIG. 11 is a view showing a modified example of ROM in the magnetic disk drive shown in FIG. 1.

This DC offset current is different for each cylinder in which the head is positioned. It is thus necessary to record an offset quantity for each cylinder in a table form in ROM 8 of the embodiment. Accordingly, in this modified example, as shown in FIG. 11, ROM 8a is provided with an offset table for recording an offset quantity for each cylinder as an initial value, in addition to a program necessary for the operation of CPU 6.

However, since a shift occurs between an initial value stored in this offset table and an actual DC offset current value for each cylinder, when a power is input to start the magnetic disk drive, correction must be made for respective areas divided by the specified number of cylinders. Accordingly, a value obtained by adding a correction value to the initial value of the offset table is used as a DC offset current value. This DC offset current value is almost equal to an average value among the VCM control current values of a track in which the MR head is positioned.

Therefore, even if a thermal asperity occurs in the servo signal area, that is, if information different from positional information to be originally obtained is provided, it is possible to continue proper positioning control by supplying a value obtained by correcting an initial value stored in the offset table as a VCM control current value. This makes it possible to read data recorded in the data area of a target sector irrespective of the occurrence of a thermal asperity.

As discussed above, according to the invention, the magnetic disk drive is provided with the function for detecting a servo area in which a thermal asperity occurs and if a thermal asperity occurs in the servo area after the shipment of the magnetic disk drive, processing different from that in the case of a usual address error occurrence is performed. In this manner, it is possible to write/read data in or from a data sector existent in the servo sector in which a thermal asperity occurs. In addition, by executing alternative processing for transferring the data to another normal data sector, it is possible to prevent a thermal asperity from occurring when the same data is to be read/written.

Furthermore, even if this thermal asperity occurs in the servo signal area, that is, if information different from positional information to be originally obtained is provided, by supplying an average value among the VCM control currents of the previous servo sector or a value obtained by correcting a DC offset current value as a VCM control current value to the VCM driver, it is possible to prevent MR head positioning control from becoming unstable and continue proper positioning control.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magnetic disk drive comprising:

an MR (Magnetoresistive) head;

a magnetic disk as a storage medium, which has a plurality of concentric tracks provided in a radial direction and each having a plurality of servo sectors each including a data area and a servo area;

reading means for reading data stored in said magnetic disk by using said MR head;

detecting means for detecting a thermal asperity occurring in the servo area from the data read by said reading means; and supply means for supplying a control current to control the position of the MR head, wherein an amount of the control current is supplied such that the MR head is positioned in a desired position when said detecting means detects the thermal asperity, wherein said servo area includes a servo sector portion in which a servo sector address is recorded;

a head portion in which a head address is recorded;

a cylinder portion in which a cylinder address is recorded; and a burst portion in which data to be used for indicating a positioning error of said MR head in a cylinder is recorded, and wherein the detecting means includes means for determining in which of said servo sector portion, head portion, cylinder portion and burst portion the thermal asperity has occurred when the occurrence of the thermal asperity is detected in said servo area.

2. A magnetic disk drive comprising:

an MR (Magnetoresistive) head;

a magnetic disk as a storage medium, which has a plurality of concentric tracks provided in a radial direction and each having a plurality of servo sectors each having a data area and a servo area including a burst portion recorded in which data to be used for indicating a positioning error of said MR head is recorded;

positioning means for positioning said MR head in a position on said magnetic disk in accordance with a control current;

reading means for reading data stored in said magnetic disk by using said MR head;

detecting means for detecting a thermal asperity occurring in the servo area from the data read by said reading means;

first supplying means for supplying the control current in accordance with data recorded in said servo area to said positioning means so that said MR head is positioned in a desired position; and second supplying means for supplying an optimal control current to said positioning means instead of the control current supplied by said first supplying means when said detecting means detects the thermal asperity has occurred in said servo area.

3. A magnetic disk drive according to claim 2, wherein a value of the optimal control current is an average value of the control currents supplied by said first supplying means.

4. A magnetic disk drive according to claim 2, wherein a value of the optimal control current is a DC offset current.

5. A servo control method in a magnetic disk drive having a MR head and a magnetic disk which has a plurality of concentric tracks provided in a radial direction and having servo sectors each having a data area and a servo area, said servo control method comprising the steps of:

reading data stored in said magnetic disk by using said MR head;

detecting a thermal asperity occurring in the servo area from the data read in said reading step; and supplying a control current in which an amount of the control current is supplied such that the MR head is positioned in a desired position when the thermal asperity is detected, wherein said servo area includes a servo sector portion in which a servo sector address is recorded;

a head portion in which a head address is recorded;

a cylinder portion in which a cylinder address is recorded; and a burst portion in which data to be used indicating a positioning error of said MR head in a cylinder is recorded, and said detecting step includes a substep of determining in which of the servo sector portion, head portion, cylinder portion and burst portion the thermal asperity has occurred, when said detecting step detects the thermal asperity has occurred in said servo area.

6. A servo control method in a magnetic disk drive having a MR head and a magnetic disk which has a plurality of concentric tracks provided in a radial direction and having servo sectors each having a data area and a servo area, said servo control method comprising the steps of:

reading data stored in said magnetic disk by using said MR head;

detecting a thermal asperity occurring in the servo area from the data read in said reading step; and supplying a control current in which an amount of the control current is supplied such that the MR head is positioned in a desired position when the thermal asperity is detected, wherein said detecting step includes a substep of performing substitute processing, when said detecting step determines the thermal asperity has occurred in the servo area, for writing data recorded in a data area corresponding to said servo area in which the thermal asperity has occurred, into a data area of a predetermined servo sector.

7. A magnetic disk drive comprising:

an magnetoresistive (MR) head;

a magnetic disk as a storage medium, which has a plurality of concentric tracks provided in a radial direction and each having a plurality of servo sectors that each include a data area and a servo area, the servo areas each include a burst portion with data recorded therein to be used for indicating a positioning error of said MR head;

positioning means for selectively positioning said MR head relative to the tracks in accordance with a control current;

a controller for supplying the control current to the positioning means, and for controlling a read operation for reading data stored in the servo sectors of said magnetic disk by using said MR head;

detecting means for detecting a thermal asperity occurring in the servo areas of the servo sectors from the data read in the read operation, the detecting means also detecting whether or not the detected thermal asperity occurred in the burst portions of the servo areas;

wherein during the read operation of any one of the tracks:

if no thermal asperity is detected in the burst portions of the one track, the controller supplies a burst data control current to the positioning means that is determined from data read from the burst portions of the one track to position the MR head relative to the one track, and if a thermal asperity is detected in at least one burst portion of the one track, the controller supplies an optimal control current to the positioning means that is not determined from data read from the one burst portion to position the MR head in a desired position relative to the one track.

8. A magnetic disk drive according to claim 7, wherein the optimal control current is determined from an average value of burst data control current values supplied before the thermal asperity is detected.

9. A magnetic disk drive according to claim 7, wherein the optimal control current is a predetermined DC offset control current for the one track.

10. A servo control method in a magnetic disk drive having a MR head and a magnetic disk which has a plurality of concentric tracks provided in a radial direction and each having a plurality of servo sectors that each include a data area and a servo area, the servo areas each include a burst portion with data recorded therein to be used for indicating a positioning error of said MR head, said disk drive including positioning means for selectively positioning said MR head relative to the tracks in accordance with a control current, said servo control method comprising the steps of:

performing a read operation on one of said plurality of concentric tracks for reading data stored therein by using said MR head;

detecting whether a thermal asperity occurs in the burst portions of servo sectors read during the read operation; and supplying a control current to a positioning means to position the MR head to a desired position relative to said track read, wherein if no thermal asperity is detected in the detecting step, then the control current is determined from data read from the burst portions of the one track, and if a thermal asperity is detected in at least one burst portion of said track read, the control current is determined from a control current value determined prior to said thermal asperity being detected.

11. The method of claim 10, wherein said current value determined prior to said thermal asperity being detected is determined from an average value of control current values supplied before the thermal asperity is detected.

12. The method of claim 10, wherein said current value determined prior to said thermal asperity being detected is a predetermined DC offset control current for the one track.

* * * * *